United States Patent
Strothmann

(10) Patent No.: US 7,191,042 B2
(45) Date of Patent: Mar. 13, 2007

(54) SYSTEM AND METHOD FOR STEERING A MULTI-WHEEL DRIVE VEHICLE

(75) Inventor: Thomas Strothmann, Wallenhorst (DE)

(73) Assignee: Invacare Corp., Elyria, OH (US)

( * ) Notice: Subject to any disclaimer, the term of this patent is extended or adjusted under 35 U.S.C. 154(b) by 0 days.

(21) Appl. No.: 10/815,308

(22) Filed: Apr. 1, 2004

(65) Prior Publication Data
US 2004/0186633 A1 Sep. 23, 2004

Related U.S. Application Data

(63) Continuation of application No. 10/279,606, filed on Oct. 24, 2002, now Pat. No. 6,807,466, which is a continuation of application No. 09/773,793, filed on Feb. 1, 2001, now Pat. No. 6,526,336.

(51) Int. Cl.
*B62D 6/00* (2006.01)
*B62D 11/00* (2006.01)

(52) U.S. Cl. .............. 701/41; 701/36; 180/6.5

(58) Field of Classification Search .............. 701/1, 701/89, 90, 41, 81, 67, 68; 180/6.5; 340/441
See application file for complete search history.

(56) References Cited

U.S. PATENT DOCUMENTS

| | | | |
|---|---|---|---|
| 3,897,840 A | 8/1975 | Molzahn et al. | |
| 4,127,182 A * | 11/1978 | Thole | 180/168 |
| 4,322,670 A | 3/1982 | Taylor | |
| 4,334,694 A | 6/1982 | Iwanicki | |
| 4,754,824 A | 7/1988 | Olsson | |
| 4,790,399 A | 12/1988 | Middlesworth | |
| 4,800,977 A * | 1/1989 | Boegli et al. | 180/168 |
| 4,926,954 A | 5/1990 | Ataka et al. | |
| 4,939,650 A * | 7/1990 | Nishikawa | 701/26 |
| 5,109,694 A | 5/1992 | Yahagi et al. | |
| RE34,057 E | 9/1992 | Middlesworth | |

(Continued)

FOREIGN PATENT DOCUMENTS

WO    WO 93/08063    4/1993

(Continued)

OTHER PUBLICATIONS

Office Action for U.S. Appl. No. 09/773,793, Date Mailed Dec. 7, 2001.

(Continued)

*Primary Examiner*—Cuong Nguyen
(74) *Attorney, Agent, or Firm*—Calfee Halter & Griswold

(57) ABSTRACT

A system and method of controlling a multi-wheel drive vehicle is provided. The invention is preferably applicable to the steering of such a vehicle and determines the individual velocities for each wheel drive. In this regard, the invention includes two general steps. The first step includes determining the distance of each wheel drive and a vehicle velocity reference point from a turning reference point. The second step includes ratioing each wheel drive's distance from the turning reference point with the vehicle velocity reference point's distance from the turning reference point. The ratios are then applied to a vehicle velocity associated with the vehicle velocity reference point to determine the velocity of each respective wheel drive. Once determined, the velocities are output to each wheel drive.

27 Claims, 4 Drawing Sheets

U.S. PATENT DOCUMENTS

| | | | |
|---|---|---|---|
| 5,157,611 A | 10/1992 | Ikeda et al. | |
| 5,168,953 A | 12/1992 | Naito | |
| 5,305,218 A | 4/1994 | Ghoneim | |
| 5,388,658 A * | 2/1995 | Ando et al. | 180/197 |
| 5,487,437 A * | 1/1996 | Avitan | 180/6.5 |
| 5,769,510 A | 6/1998 | Akuzawa et al. | |
| 5,794,203 A | 8/1998 | Kehoe | |
| 5,879,061 A | 3/1999 | Koibuchi | |
| 5,928,295 A * | 7/1999 | Geier | 701/29 |
| 6,072,424 A | 6/2000 | Cremona et al. | |
| 6,167,354 A | 12/2000 | Maleki et al. | |
| 6,223,116 B1 | 4/2001 | Kin et al. | |
| 6,223,118 B1 * | 4/2001 | Kobayashi et al. | 701/96 |
| 6,275,753 B1 | 8/2001 | Kyrtsos | |
| 6,275,762 B1 * | 8/2001 | Salg | 701/69 |
| 6,282,479 B1 | 8/2001 | Ghoneim et al. | |
| 6,295,487 B1 | 9/2001 | Ono et al. | |
| 6,313,742 B1 | 11/2001 | Larson | |
| 6,392,535 B1 * | 5/2002 | Matsuno et al. | 340/441 |
| 6,526,336 B2 * | 2/2003 | Strothmann | 701/1 |

FOREIGN PATENT DOCUMENTS

| | | |
|---|---|---|
| WO | WO 00/32462 | 6/2000 |

OTHER PUBLICATIONS

Office Action for U.S. Appl. No. 09/773,793, Date Mailed Apr. 17, 2002.

Office Action for U.S. Appl. No. 10/279,606, Date Mailed Mar. 26, 2003.

Notice of Allowability for U.S. Appl. No. 10/279,606, Date Mailed Jun. 7, 2004.

Office Action for U.S. Appl. No. 10/279,606, Date Mailed Nov. 17, 2003.

Office Action for Australian Patent Application No. 2002236759, Date Mailed May 31, 2004.

Office Action for New Zealand Patent Application No. 527018, Date Mailed Jul. 27, 2004.

* cited by examiner

SYSTEM AND METHOD FOR STEERING A MULTI-WHEEL DRIVE VEHICLE

CROSS-REFERENCES TO RELATED APPLICATIONS

This application is a continuation of application Ser. No. 10/279,606 filed Oct. 24, 2002, now U.S. Pat. 6,807,466 and titled "System and Method for Steering a Multi-Wheel Drive Vehicle," which is a continuation of Ser. No. 09/773,793, filed Feb. 1, 2001, and titled "System and Method for Steering a Multi-Wheel Drive Vehicle," issued U.S. Pat. No. 6,526,336. These references are incorporated herein by reference.

FIELD OF THE INVENTION

The invention relates generally to multi-wheel drive vehicles and, more particularly, to the steering of mult-wheel drive vehicles such as, for example, wheelchairs and the like.

BACKGROUND OF THE INVENTION

Generally, a multi-wheel drive vehicle is any vehicle that has more than one wheel that is used to power or drive the vehicle. Examples of such vehicles include two and four wheel drive wheelchairs. Driving such vehicles in straight lines does not pose significant control issues. However, this is generally not the case when driving such vehicles into turns. More specifically, to drive a multi-wheel drive vehicle into a turn requires that each of the wheel drives have differing velocities in order to achieve the turn.

If these differing velocities are not properly realized in the wheel drives, several undesirable consequences result. For example, if one or more of the wheel drives has a velocity below that required to make the turn at a particular vehicle speed, those affected wheel drives will at least partially "drag" along the riding surface. This is undesirable for several reasons. First, it creates wear on the wheel component of the wheel drive. Second, it creates wear on the riding surface. If the riding surface is, for example, a carpet, then such carpet may be damaged by such dragging action. If one or more of the wheel drives has a velocity above that required to make the turn, the vehicle will not effectively make the desired turn because the vehicle suffers from understeer. Additionally, such non-optimal control of the wheel drives leads to higher energy consumption by the vehicle, which significantly reduces the vehicle's range. Hence, it desirable to provide a system and method for controlling a multi-wheel drive vehicle that does not suffer these drawbacks.

SUMMARY OF THE INVENTION

According to one embodiment of the present invention, a method of controlling a multi-wheel drive vehicle is provided. The method is preferably applicable to the steering of such a vehicle and determines the individual velocities for each wheel drive. In this regard, the method includes two general steps. The first step includes determining the distance of each wheel drive and a vehicle velocity reference point from a turning reference point. The second step includes ratioing two components: the distance from the turning reference point to each wheel drive and the distance from the turning reference point to the vehicle velocity reference point. The ratios are then applied to a vehicle velocity that is associated with the vehicle velocity reference point, to determine the velocity of each respective wheel drive. Once determined, the velocities are output to each wheel drive.

According to another embodiment of the present invention, a method of controlling a multi-wheel drive vehicle includes, for example, the step of determining a turning reference, vehicle velocity, and reference distance. The reference distance is the distance between the turning reference and a known reference position relative to the vehicle. The method further includes, for example, determining a wheel drive distance and velocity for each wheel drive. The wheel drive distance is the distance of each wheel drive from the turning reference. The velocity for a wheel drive is determined from the wheel drive distance, reference distance and vehicle velocity. Once the velocity for each wheel drive has been determined, it is outputted to each wheel drive.

According to another embodiment of the present invention a system for controlling a multi-wheel drive vehicle is provided. The system includes, for example, an input device, a controller in circuit communication with the input device, at least two wheel drives in circuit communication with the controller, and logic for determining the individual velocities for the at least two wheel drives.

Hence, the present invention is particularly useful for any vehicle having two or more wheel drives. The present invention is also applicable to any vehicle that allows for individual wheel drive control. Such vehicles include electrically driven vehicles and combustion engine driven vehicles. The present invention is also particularly useful in that it can replace conventional transmissions including differential gearboxes, four wheel coupling transmissions, and special "visco" clutches, just to name a few. It should also be noted that the present invention can also be used with such conventional transmissions that allow for individual wheel drive control.

Therefore, it is an advantage of the present invention to provide a method of steering a multi-wheel drive vehicle by determining the velocity of each individual wheel drive.

It is another advantage of the present invention to provide a system for steering a multi-wheel drive vehicle that includes a means for determining the individual velocities of each wheel drive.

It is yet another advantage of the present invention to provide a surface tolerant drive system that includes a means for driving a vehicle when the wheel drives are on differing surfaces.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
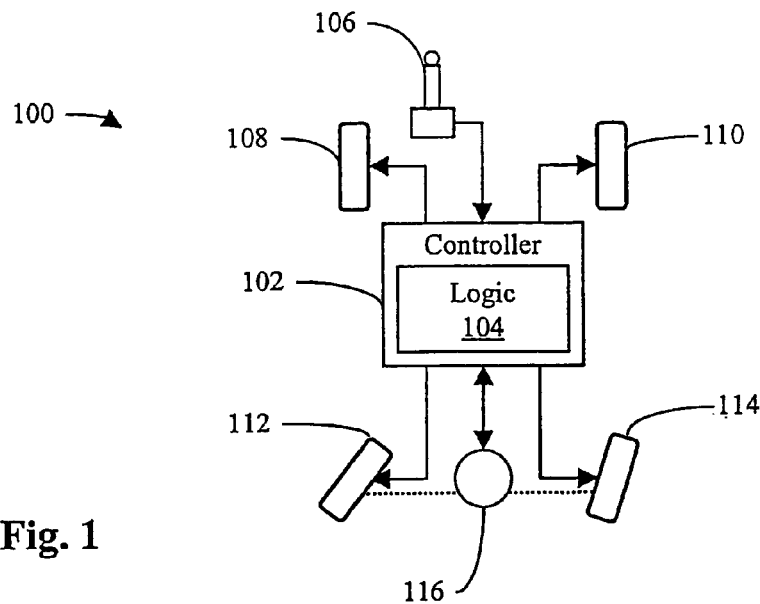
FIG. 1 is a general block diagram of a control system 100 of the present invention.

Illustrated in FIG. 1 is a block diagram of a system 100 of the present invention. System 100 has a controller 102, logic 104, input device 106, and wheel drives 108, 110, 112, and 114. Controller 102 is any computer-based controller suitable for controlling a vehicle. In this regard, controller 102 generally has a processor, memory, and input/output components (not shown). Controller 102 can also have electric motor drive circuitry associated therewith (not shown).

Input device 106 is in circuit communication with controller 102 and provides input signals thereto. More specifically, input device 106 is preferably a user manipulable device such as a joystick or other similar device. In this regard, input device 106 at least provides vehicle velocity and turning vector information. Generally, such vector information is in the form of magnitude and direction information. In its simplest form, input device 106 outputs "x" and "y" Cartesian coordinate information wherein the "x" coordinate relates to turning vector information and the "y" coordinate relates to velocity vector information.

Wheel drives 108, 110, 112, and 114 are also in circuit communication with controller 102. Each wheel drive preferably as a wheel component and a drive component. The drive component is preferably responsible for driving the wheel component and can be in the form of any one of a number of embodiments. For example, one embodiment of a drive component is a gearless, or transmissionless, brushless electric motor. Another embodiment of a drive component is a brushed electric motor and a gearbox, or transmission, communicating with the wheel component. Each wheel drive may also have electric motor drive circuitry associated therewith that receives drive control signals from controller 102 and correspondingly translates these control signals to properly drive the wheel drive. Other embodiments include combustion engines with electronic or hydraulic transmissions. For example, a single combustion engine may be coupled with a transmission system that allows each drive wheel to be driven at a different velocity. Further variations of these embodiments are also intended to fall within the scope of the present invention. Hence, the present invention is applicable to and includes numerous embodiments of wheel drives.

Also in circuit communication with controller 102 is a steering servo-mechanism 116. The steering servo mechanism 116 is in physical communication with wheel drives 112 and 114 and physically drives the angular position of such wheel drives. In this regard, steering servo mechanism 116 has associated therewith a position resolver or potentiometer (not shown), which outputs the steering servo mechanism's 116 angular position β. (See FIG. 2). One example of a common steering servo-mechanism is a rack-and-pinion mechanism. Other types of steering servo-mechanisms also exist that can be employed.

Logic 104 of the present invention determines the velocity of each wheel drive 108, 110, 112, and 114. As will be described in connection with FIGS. 2 through 5, logic 104 employs vehicle velocity and turning information to appropriately determine the required wheel drive velocities to ensure when driving into a turn that the turn is preferably taken without any of the wheel drives dragging on the riding surface.

In the preferred embodiment, system 100 is applied to a vehicle such as, for example, a four-wheel drive wheelchair. However, system 100 is applicable to other multi-wheel drive vehicles such as scooters, golf carts, and all-terrain vehicles just to name a few examples. Generally, any vehicle having more then one wheel drive can benefit from the present invention.

Figure 2:
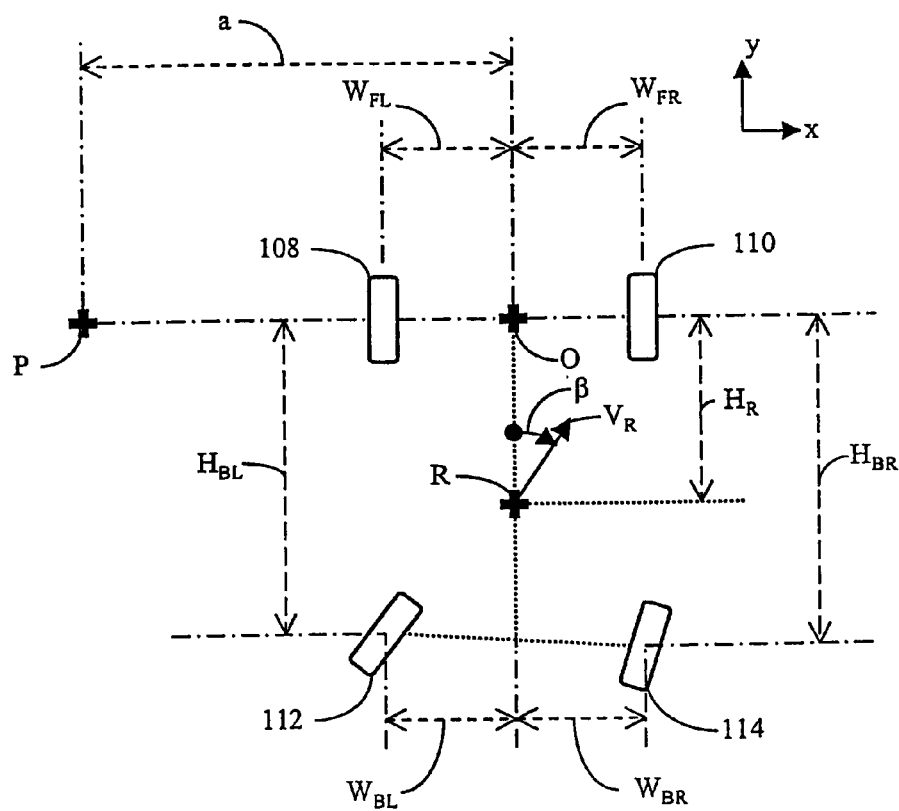
FIG. 2 is a block diagram illustrating the spatial relationships of the wheel drives and reference points of one exemplary embodiment of the present invention.

Referring now to FIG. 2, the present discussion will now focus on the general logic of the present invention as it applies to, for example, a four-wheel drive vehicle. More specifically, FIG. 2 illustrates several reference points and dimensions that are employed by logic 104 with reference to the location of wheel drives 108, 110, 112, and 114. In this regard, the wheel base positions or dimensions are defined as $H_{BL}$, and $W_{BL}$ for the left rear wheel drive 112 and $H_{BR}$ and $W_{BR}$ for right rear wheel drive 114. The wheel base positions or dimensions for the front left and right wheel drives 108 and 110 are defined by $W_{FL}$ and $W_{FR}$. The above-defined wheel drive base dimensions H and W values denote vertical and lateral distances, respectively, from a reference point "O," which is the center or origin of the vehicle's coordinate system. Additionally, these values are all stored in the memory of controller 102 for use by logic 104, as will be explained below.

A turning reference point "P" exists that is a turning reference distance "α" from point "O". Turning reference point "P" defines a point about which the vehicle desires to turn. A third point "R" exists laterally between wheel drives 112 and 114 and spatially defines the vehicle's velocity reference point. The steering servo-mechanism 116 is mechanically coupled to the rear wheels. The steering servo-mechanism 116 is typically a geared motor, which drives a lever and a position feedback potentiometer. The feedback potentiometer defines an angular position in terms of an angle β, as shown. The angle β is used to determine the turning reference distance a between turning reference point "P" and point "O", as shown in FIG. 2. This determination is made via Equation (1):

$$\alpha = H_R \times \tan \beta \qquad \text{Eq. (1)}$$

where β is the angle formed between the "y" axis running through point "O" (positive direction shown) and the vehicle's velocity vector $V_R$, and $H_R$ is the vertical distance between point "O" and the velocity reference point "R". For example, if $H_R=1$ then when angle β is 45 degrees, the turning reference distance α between turning reference point "P" and point "O" is equal to one. In this example, turning reference distance of α=1 represents a turning radius of 1 yard, meter, foot, or other units as desired. The location of turning reference point "P" relative to point "O" is determined via Equation (2):

$$P = -H_R \times \cot(\beta) = H_R \times \cot(-\beta) \qquad \text{Eq. (2)}$$

Figure 3:
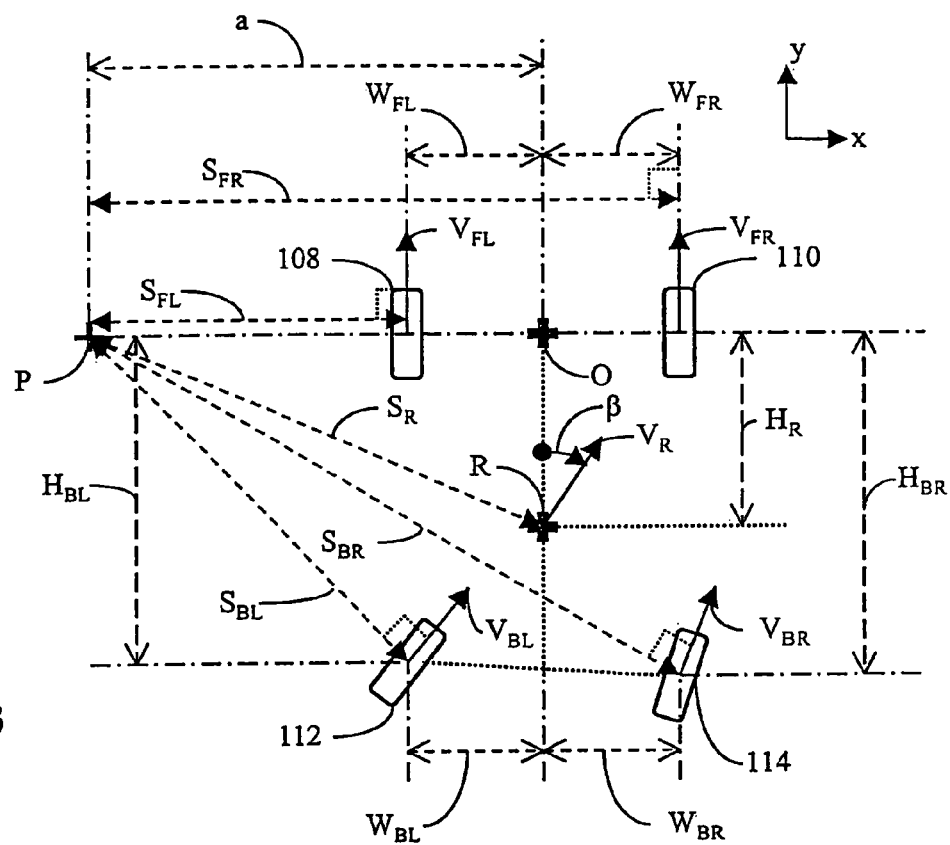
FIG. 3 is a block diagram further illustrating the spatial relationships of the wheel drives and reference points of one exemplary embodiment of the present invention.

Having defined the turning reference distance a and the wheel base positions, reference is now made to FIG. 3. FIG. 3 illustrates distances S from turning reference point "P" to each wheel drive and the velocities V of each wheel drive. In this regard, logic 104 employs either of two approaches to determine the individual wheel drive velocities. The first approach utilizes a two step analysis wherein the first step is to determine, from turning reference point "P", the distance of each of the wheel drives and the vehicle's velocity reference point "R". Once these distances are known, the individual wheel drive velocities can be determined based on the known velocity at the vehicle's velocity reference point "R" and the wheel drive's distance from turning reference point "P". The second approach utilizes the steering servo-mechanism's 116 angular position β and the vehicle's wheel drive base dimensions.

Referring now to FIG. 3, the present discussion will now focus on the first approach described above. In this regard, distance $S_{FL}$ is the distance between wheel drive 108 and turning reference point "P." Similarly distances $S_{FR}$, $S_{BL}$, and $S_{BR}$ represent the distances between wheel drives 110, 112, and 114, respectively, and turning reference point "P." Distance $S_R$ represents the distance between vehicle's velocity reference point "R" and turning reference point "P." So defined, these distances can be determined according to Equations (3)–(7):

$$S_{FL} = a - \frac{w}{2} \quad \text{Eq. (3)}$$

$$S_{FR} = a + \frac{w}{2} \quad \text{Eq. (4)}$$

$$S_{BL} = \sqrt{(a - W_{BL})^2 + H_{BL}^2} \quad \text{Eq. (5)}$$

$$S_{BR} = \sqrt{(a + W_{BR})^2 + H_{BR}^2} \quad \text{Eq. (6)}$$

$$S_R = \sqrt{a^2 + H_R^2} \quad \text{Eq. (7)}$$

Once all of the wheel drive distances S from turning reference point "P" have been determined, the vehicle's velocity $V_R$ and the individual velocities $V_{BL}$, $V_{BR}$, $V_{FL}$, and $V_{FR}$, for wheel drives, 112, 114, 108, 110, respectively, can be determined. In this regard, velocities $V_R$, and $V_{BL}$ and $V_{BR}$ for wheel drives 112 and 114 can be determined from Equations (8)–(10):

$$V_R = f(x, y) \quad \text{Eq. (8)}$$

$$V_{BL} = \frac{S_{BL}}{S_R} \times V_R \quad \text{Eq. (9)}$$

$$V_{BR} = \frac{S_{BR}}{S_R} \times V_R \quad \text{Eq. (10)}$$

In Equation (8), the vehicle's velocity $V_R$ is a function $f(x,y)$ of the output signals of input device 106. In this regard, The "x" coordinate provides data for determining a turning vector's magnitude and direction and the "y" coordinate provides data relevant to both the vehicle's velocity vector magnitude and direction and the turning vector magnitude and direction. Typically, the function $f(x,y)$ also provides for, among other things, limitations on the vehicle's top velocity, rate of acceleration, and/or rate of deceleration, for safety and proper operation of the vehicle. The exact parameters of function $f(x,y)$ are generally determined based on a particular wheelchair's design. Also, the vehicle's turning vector information is typically a function $g(x,y)$ of both the "x" and "y" coordinate data. In this regard, the "y" coordinate (or velocity data) is typically used to reduce the magnitude of the turning vector at higher vehicle velocities for purposes of safety (e.g., to prevent the vehicle from flipping or rolling over.) Once again, the exact parameters of $g(x,y)$ are determined based on a particular wheelchair's design. Additionally, the velocity function $f(x,y)$ and turning function $g(x,y)$ may be implemented using the polar output information $(r,\theta)$. Hence, the velocity function would be in the form of $f(r,\theta)$ and the turning function would be in the form of $g(r,\theta)$, where the parameters of each function are determined based on a wheelchair's particular design. Moreover, the turning function $g(x,y)$ or $g(r,\theta)$ can itself be modified by a function $m(g(x,y))$ to account for the difference between the turning function's angular output result and the servo-mechanism's actual angular position. Such differences arise, for example, because the servo-mechanism requires a finite time between changes in angular positioning and because the actual servo-mechanism angular position may be slightly different from that determined via the output of input device 106. Once the reference velocity $V_R$ is determined, it is stored in the memory of controller 102 for use in determining the individual wheel drive velocities.

The equations for determining velocities $V_{FL}$, and $V_{FR}$ for wheel drives 108 and 110, respectively, are dependent on angle β and can be shown to be defined by Equations (11)–(14):

$$V_{FL} = \frac{S_{FL}}{S_R} \times V_R \quad \text{for } 0 \geq \beta \geq -\pi \quad \text{Eq. (11)}$$

$$V_{FR} = \frac{S_{FR}}{S_R} \times V_R \quad \text{for } 0 \geq \beta \geq -\pi \quad \text{Eq. (12)}$$

$$V_{FL} = \frac{-S_{FL}}{S_R} \times V_R \quad \text{for } 0 \leq \beta \leq \pi \quad \text{Eq. (13)}$$

$$V_{FR} = \frac{-S_{FR}}{S_R} \times V_R \quad \text{for } 0 \leq \beta \leq \pi \quad \text{Eq. (14)}$$

Generally, Equations (9)–(14) determine each wheel drive's velocity V by ratioing each wheel drive distance S with the vehicle's velocity reference point distance $S_R$ and then applying that ratio to the vehicle velocity $V_R$ designated at the vehicle velocity reference point "R". Hence, by determining the individual wheel drive distances, the individual wheel drive velocities can be determined therefrom.

Still referring to FIG. 3, the second approach described above utilizes the steering servo-mechanism's 116 angular position β and the vehicle's wheel drive base dimensions to determine each individual wheel drive velocity. In this regard, wheel drive velocities $V_{BL}$, $V_{BR}$, $V_{FL}$, and $V_{FR}$ can be defined by the following Equations (15)–(18) derived from FIG. 3:

$$V_{BL} = V_R \times \frac{\sqrt{\left[H_R \times \cos(-\beta) - \frac{W_B}{2} \times \sin(-\beta)\right]^2 + [H_B \times \sin(-\beta)]^2}}{H_R} \quad \text{Eq. (15)}$$

$$V_{BR} = V_R \times \frac{\sqrt{\left[H_R \times \cos(-\beta) + \frac{W_B}{2} \times \sin(-\beta)\right]^2 + [H_B \times \sin(-\beta)]^2}}{H_R} \quad \text{Eq. (16)}$$

-continued $$V_{FL} = V_R \times \left[\cos(-\beta) - \frac{W_F}{2 \times H_R} \times \sin(-\beta)\right] \quad \text{Eq. (17)}$$

$$V_{FR} = V_R \times \left[\cos(-\beta) + \frac{W_F}{2 \times H_R} \times \sin(-\beta)\right] \quad \text{Eq. (18)}$$

In Equations (15)–(18), wheel drive base dimensions $W_B=W_{BL}+W_{BR}$ and $W_F=W_{FL}+W_{FR}$ and reference dimension $H_B=H_{BL}=H_{BR}$ and $V_R$ is determined via Eq. (8). (See, for example, FIG. 3 showing the aforementioned dimensions and angle). Additional drive wheels that are connected to a steering servo-mechanism would follow the general form of Equations (15) and (16) such as, for example, in the case of a six-wheel drive vehicle that has four steerable wheel drives. Equations (15)–(18) are similar to Equations (9)–(14) except that Equations (15)–(18) incorporate the steering servo-mechanism's 116 angular position β and, therefore, simplify the determination of $V_{FL}$ and $V_{FR}$. Hence, the individual wheel drive velocities can be determined based on the steering servo-mechanism's 116 angular position β and the wheel base dimensions of the vehicle.

A third embodiment of the present invention provides for the determination of the steering angle for individually steerable wheel drives. It should also be noted that both previous embodiments of the invention can also be derived from the following general approach. In this regard, the positions of reference points "P" and "R" and wheel drives 108, 110, 112, and 114 can be determined via Equation (2) and physical measurement of the vehicle's dimensions, respectively. These positions can then be generally represented as follows:

| | | |
|---|---|---|
| P = ($X_P$, 0) | Wheel drive 108 = ($X_{FL}$, 0) | Wheel drive 110 = ($X_{FR}$, 0) |
| R = ($X_R$, $Y_R$) | Wheel drive 112 = ($X_{BL}$, $Y_{BL}$) | Wheel drive 114 = ($X_{BR}$, $Y_{BR}$) |

The steering angle for wheel drive 112 can then be determined via Equations (19)–(22):

$$V_{BLy} = (X_R - X_{BL}) \times \frac{V_{RX}}{Y_R} + V_{RY} \quad \text{Eq. (19)}$$

$$V_{BLx} = Y_{BL} \times \frac{V_{RX}}{Y_R} \quad \text{Eq. (20)}$$

$$\angle\overrightarrow{V_{BL}} = \arctan\left(\frac{V_{BLy}}{V_{BLx}}\right) \quad \text{for } V_{BLx} \geq 0 \quad \text{Eq. (21)}$$

$$\angle\overrightarrow{V_{BL}} = \arctan\left(\frac{V_{BLy}}{V_{BLx}}\right) + \pi \quad \text{for } V_{BLx} < 0 \quad \text{Eq. (22)}$$

wherein $V_{RX}=V_R \sin\beta$ and $V_{RY}=V_R \cos\beta$. Equations (19) and (20) determine the "x" and "y" components of velocity $V_{BL}$ for wheel drive 112. Equations (21) and (22) determine the angle based on the sign of $V_{BLX}$. The velocity $V_{BL}$ can be determined via Equation (23):

$$V_{BL} = \sqrt{(V_{BLx})^2 + (V_{BLy})^2} \quad \text{Eq. (23)}$$

The velocities and steering angles for wheel drives 108, 110, and 114 can be similarly determined. Once the velocities and steering angles have been determined for all of the wheel drives, they can be output to each wheel drive to effect movement of the vehicle.

Figure 4:
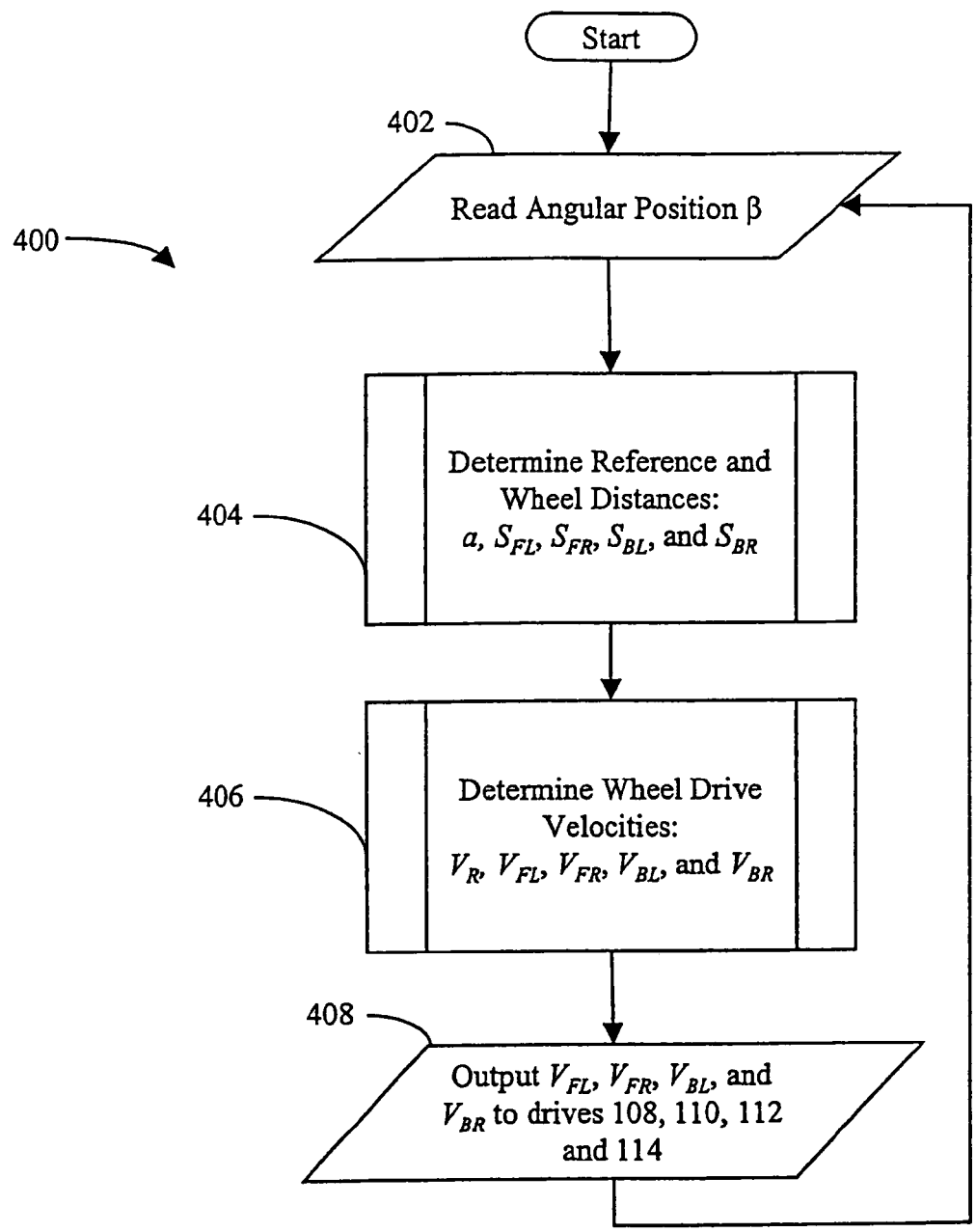
FIG. 4 is a flowchart generally illustrating the logic steps executed by a first embodiment of the present invention to determine the individual wheel drive velocities.

Illustrated in FIG. 4 is a flowchart 400 representation of the above-described logic employing Equations (1) and (8)–(14). The logic starts in step 402 where the logic reads the angular position β of steering servo-mechanism 116. The logic next advances to step 404 where the reference distance a, individual wheel drive distances S, and vehicle velocity reference point distance SR are determined via equations (1) and (3)–(7), respectively. After step 404, the logic advances to step 406 where the velocities for each wheel drive are determined based on each wheel drive's distance S, the vehicle velocity reference point distance $S_R$, the overall vehicle velocity $V_R$, and angle β. (See, for example, FIG. 3 and Equations (8)–(14)). After all of the wheel drive velocities have been determined, they are output in step 408 to the wheel drives. After step 408, the logic loops back to step 402 and the logic repeats. It should also be noted that an additional step can be included for individually steerable wheel-drives that includes outputting the steering angle for each wheel drive to the individual wheel drive for effecting movement of the vehicle.

Figure 5:
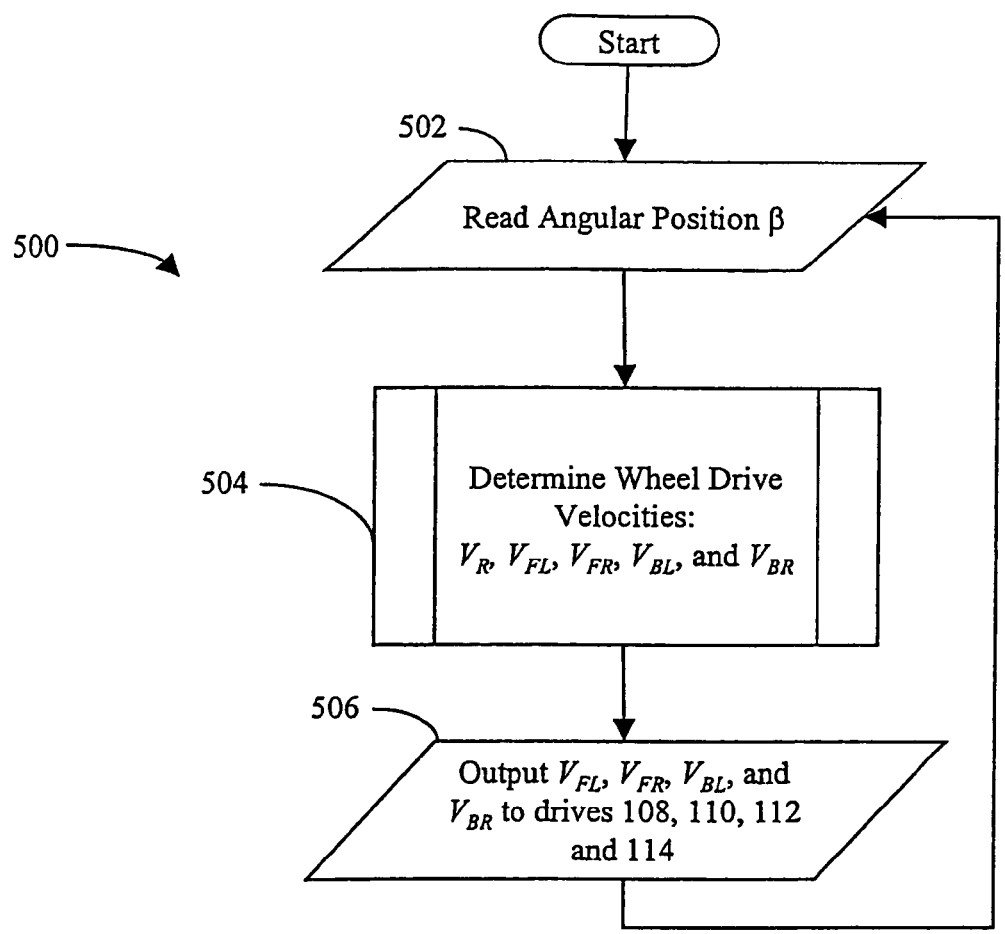
FIG. 5 is a flowchart generally illustrating the logic steps executed by a second embodiment of the present invention to determine the individual wheel drive velocities.

FIG. 5 illustrates a flowchart 500 representation of the above-described logic employing Equations (8) and (15)–(18). In this regard, the logic starts in step 502 where the angular position β of steering servo-mechanism 116 is read. The logic next advances to step 504 where the reference velocity and the velocities for each wheel drive are determined via equations (8) and (15)–(18). In step 506, the logic outputs the individual velocities to the appropriate wheel drives. After step 506, the logic loops back to step 502 and the logic repeats. Once again, it should also be noted that an additional step can be included for individually steerable wheel-drives that includes outputting the steering angle for each wheel drive to the individual wheel drive for effecting movement of the vehicle.

In summary, by determining the individual wheel drive velocities for a mult-wheel drive vehicle, accurate turns may be taken by the vehicle that do not cause oversteer, understeer, or any of the wheel drives to drag along the riding surface. The velocities can be determined by either of two approaches. The first approach generally utilizes a two step analysis. The first step determines the distance of each wheel drive from a turning reference point. Once the distances have been determined, the velocities are determined in a second step by ratioing the wheel drive distance from the turning reference point and the vehicle's velocity reference point distance from the turning point and applying that ratio to the vehicle velocity. The second approach utilizes the steering servo-mechanism's angular position and the vehicle's wheel drive base dimensions, along with the vehicle velocity, to determine the individual wheel drive velocities. Once all of the individual wheel drive velocities have been determined, they are applied to the wheel drives. Moreover, for individually steerable wheel drives, the steering angle can be determined through the wheel drive's velocity "x" component and "y" component.

In this manner, each wheel drive is given its own velocity that is associated with the velocity and turning vector information presented by input device 106 so as to eliminate oversteer, understeer, and wheel drive drag during turning. Additionally, the vehicle is provided with a surface tolerant drive system that provides independent wheel drive velocities. For example, if a first wheel drive is on a normal road surface and a second wheel drive is on a complicated surface such as, for example, an ice surface, the vehicle will continue to be driven by virtue of the drive provided by the first wheel drive.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the "x" and "y" coordinates of each wheel drive can also be used to determine each wheel drive's respective distance from the turning reference. The velocity of any given wheel drive may be allowed to vary or deviate within a small range to account for vertical wheel movements due to, for example, obstacles, or small misalignments in the vehicles geometry or other non-idealities. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A method of controlling a multi-wheel drive vehicle comprising the steps of:
   (a) determining a turning reference and a vehicle velocity;
   (b) determining a reference distance from the turning reference;
   (c) determining a wheel drive distance from the turning reference for each wheel drive of the multi-wheel drive vehicle;
   (d) determining an independent control velocity value for each wheel drive based on the vehicle velocity, wheel drive distance, and reference distance; and
   (e) outputting the independent control velocity value for each wheel drive to each wheel drive.

2. The method of claim 1 wherein step (a) comprises reading the position output of a user manipulable control device.

3. The method of claim 1 wherein step (a) comprises reading the angular position of a steering servo-mechanism.

4. The method of claim 2 wherein step of reading the position output of a user manipulable control device comprises the step of relating Cartesian output data to a tangent of an angle formed by the Cartesian output data.

5. The method of claim 1 wherein step (a) comprises determining the turning reference based on the following relationship:

$$\alpha = H_R \times \tan \beta$$

where $\alpha$ is the turning reference, $H_R$ is the distance from an origin of the vehicle's coordinate system to a vehicle velocity reference point, and $\beta$ is an angle associated with the vehicle's steering servo-mechanism.

6. The method of claim 1 wherein step (b) comprises determining the reference distance based on the following relationship:

$$S_R = \sqrt{\alpha^2 + H^2}$$

where $S_R$ is the reference distance, $\alpha$ is the turning reference, and H is a wheel base dimension of the vehicle.

7. The method of claim 1 wherein step (d) comprises determining the velocity for each wheel drive based on the following relationship:

$$V = \frac{S}{S_R} \times V_R$$

where V is the velocity for the wheel drive, S is the wheel drive distance from the turning reference, $S_R$ is the reference distance, and $V_R$ is the vehicle velocity.

8. The method of claim 1 further comprising the step of determining a steering angle for at least one wheel drive.

9. The method of claim 8 further comprising the step of outputting the determined steering angle to the at least one wheel drive.

10. A system for controlling a multi-wheel drive vehicle comprising:
    (a) an input device;
    (b) a controller in circuit communication with the input device;
    (c) at least two wheel drives in circuit communication with the controller; and
    (d) logic for:
        (1) determining a turning reference and a vehicle velocity from the input device;
        (2) determining a reference distance from the turning reference;
        (3) determining a wheel drive distance from the turning reference for each wheel drive of the multi-wheel drive vehicle;
        (4) determining an independent control velocity value for each wheel drive based on the vehicle velocity, wheel drive distance, and reference distance; and
        (5) outputting the independent control velocity value for each wheel drive to each wheel drive.

11. The system of claim 10 wherein the input device comprises a user manipulable input device.

12. The method of claim 10 wherein the input device comprises a steering servo-mechanism.

13. The system of claim 11 wherein the user manipulable input device comprises a joystick input device.

14. The system of claim 10 wherein the logic determining a turning reference and a vehicle velocity from the input device comprises logic for determining the turning reference based on the following relationship:

$$\alpha = H_R = \tan \beta$$

where $\alpha$ is the turning reference, $H_R$ is the distance from an origin of the vehicle's coordinate system to a vehicle velocity reference point, and $\beta$ is an angle associated with the vehicle's steering servo-mechanism.

15. The system of claim 10 wherein the logic for determining a reference distance from the turning reference comprises logic for determining the reference distance based on the following relationship:

$$S_R = \sqrt{\alpha^2 + H^2}$$

where $S_R$ is a reference distance, $\alpha$ is the turning reference, and H is a wheel base dimension of the vehicle.

16. The system of claim 10 wherein the logic for determining a velocity for each wheel drive based on the vehicle velocity, wheel drive distance, and reference distance comprises logic for determining the velocity for each wheel drive based on the following relationship:

$$V = \frac{S}{S_R} \times V_R$$

where V is the velocity for the wheel drive, S is the wheel drive distance from the turning reference, $S_R$ is the reference distance, and $V_R$ is the vehicle velocity.

17. The method of claim 10 further comprising logic for determining a steering angle for at least one wheel drive.

18. The method of claim 17 further comprising logic for outputting the determined steering angle to the at least one wheel drive.

19. A system for controlling a multi-wheel drive vehicle comprising:
 (a) means for inputting at least one control signal;
 (b) a controller means in circuit communication with the means for inputting a plurality of control signals;
 (c) at least two wheel drive means in circuit communication with the controller means;
 (d) means for determining a turning reference and a vehicle velocity from the input device;
 (e) means for determining a reference distance from the turning reference;
 (f) means for determining a wheel drive distance from the turning reference for each wheel drive of the multi-wheel drive vehicle;
 (g) means for determining an independent control velocity value for each wheel drive based on the vehicle velocity, wheel drive distance, and reference distance; and
 (h) means for outputting the independent control velocity value for each wheel drive to each wheel drive.

20. The system of claim 19 wherein the means for inputting at least one control signal comprises a user manipulable means.

21. The system of claim 20 wherein the user manipulable means comprises a joystick device.

22. The method of claim 19 wherein the means for inputting at one control signal comprises a steering servo-mechanism.

23. The system of claim 19 wherein the means for determining a turning reference and a vehicle velocity from the means for inputting comprises means for determining the turning reference based on the following relationship:

$$\alpha = H_R \times \tan \beta$$

where $\alpha$ is the turning reference, $H_R$ is the distance from an origin of the vehicle's coordinate system to a vehicle velocity reference point, and $\beta$ is an angle associated with the vehicle's steering servo-mechanism.

24. The system of claim 19 wherein the means for determining a reference distance from the turning reference comprises means for determining the reference distance based on the following relationship:

$$S_R = \sqrt{\alpha^2 + H^2}$$

where $S_R$ is the reference distance, $\alpha$ is the turning reference, and H is a wheel base dimension of the vehicle.

25. The system of claim 19 wherein the means for determining a velocity for each wheel drive based on the vehicle velocity, wheel drive distance, and reference distance comprises means for determining the velocity for each wheel drive based on the following relationship:

$$V = \frac{S}{S_R} \times V_R$$

where V is the velocity for the wheel drive, S is the wheel drive distance from the turning reference, $S_R$ is the reference distance, and $V_A$ is the vehicle velocity.

26. The method of claim 19 further comprising the logic for determining a steering angle for at least one wheel drive.

27. The method of claim 19 further comprising logic for outputting the determined steering angle to the at least one wheel drive.

* * * * *